United States Patent [19]

Eickemeyer et al.

[11] Patent Number: 5,778,208
[45] Date of Patent: Jul. 7, 1998

[54] FLEXIBLE PIPELINE FOR INTERLOCK REMOVAL

[75] Inventors: Richard James Eickemeyer, Rochester, Minn.; Nadeem Malik; Avijit Saha, both of Austin, Tex.

[73] Assignee: International Business Machines Corporation, Armonk, N.Y.

[21] Appl. No.: 575,738

[22] Filed: Dec. 18, 1995

[51] Int. Cl.⁶ .................. G06F 9/38; G06F 13/42
[52] U.S. Cl. .................. 395/379; 395/556; 395/395; 364/DIG. 1; 364/DIG. 2
[58] Field of Search .............. 395/800.43, 395, 395/392, 182.07, 182.04, 555, 595, 446, 312, 440, 562, 553, 832, 380, 674, 182.1, 373, 800.41, 566, 394; 364/DIG. 1, DIG. 2, 754.02, 716.04, 736.04; 711/163, 133

[56] References Cited

U.S. PATENT DOCUMENTS

| | | | |
|---|---|---|---|
| Re. 34,052 | 9/1992 | Hester et al. | 395/393 |
| 4,750,112 | 6/1988 | Jones et al. | 395/393 |
| 4,985,825 | 1/1991 | Webb, Jr. et al. | 711/169 |
| 5,051,940 | 9/1991 | Vassiliadis et al. | 364/736.04 |
| 5,081,575 | 1/1992 | Hiller et al. | 395/312 |
| 5,099,421 | 3/1992 | Buerkle et al. | 395/392 |
| 5,193,167 | 3/1993 | Sites et al. | 711/163 |
| 5,297,281 | 3/1994 | Emma et al. | 395/392 |
| 5,299,319 | 3/1994 | Vassiliadis et al. | 395/562 |
| 5,333,284 | 7/1994 | Nugent | 395/394 |
| 5,367,648 | 11/1994 | Chuang et al. | 395/566 |
| 5,404,552 | 4/1995 | Ikenaga | 395/800.41 |
| 5,416,911 | 5/1995 | Dinkjian et al. | 395/566 |
| 5,426,743 | 6/1995 | Phillips et al. | 395/562 |
| 5,434,993 | 7/1995 | Liencres et al. | 711/133 |

FOREIGN PATENT DOCUMENTS

4-105126  4/1992  Japan.

*Primary Examiner*—Daniel H. Pan
*Attorney, Agent, or Firm*—David W. Lynch; Merchant, Gould, Smith, Edell, Welter & Schmidt

[57] ABSTRACT

A flexible pipeline for reducing performance limiting pipeline interlocks in the execution of programs. The pipeline architecture includes for each pipeline a fetch stage, a decode stage, an execution stage, a hybrid memory/execution stage, and a write back stage. When the result from the execution stage of a first pipeline is not available to a second pipeline until the write back stage of the first pipeline as a consequence of an interlock, the execution stage of the second pipeline may be delayed at least one execution cycle so that the executable functions are performed in the hybrid memory/execution stage or fourth stage of the second pipeline. The result from the execution stage is obtained either by a calculation of the effective address of a memory location or by performing arithmetic/logical unit (ALU) functions. The third stage of operation of the second pipeline carries out a null operation when the execute operation is performed in the fourth stage as a consequence of, for example, a load instruction being followed by a use instruction thereby resulting in a pipeline interlock.

38 Claims, 7 Drawing Sheets

FLEXIBLE PIPELINE FOR INTERLOCK REMOVAL

BACKGROUND OF THE INVENTION

1. Field of the Invention

This invention relates in general to pipeline processing and pipeline processors, and more particularly, to a flexible pipeline for interlock removal.

2. Description of Related Art

Microprocessor designers strive to increase performance while minimizing cost. Of the multiple factors that affect central processing unit performance, the simplest one to target is clock frequency. By increasing the clock speed, processor speed is increased. But there are fundamental limits to how fast a given chip design can operate, and sooner or later, components inside simply can't keep up. Thus, other design factors must be considered.

Another method of increasing performance of central processing units involves the employment of special pipelining techniques to overlap instruction operations. Modern microprocessors employ pipelining techniques in order to enable them to work like assembly lines. In the discussion which follows, the three terms, "machine cycle", "execution cycle" or "cycle," refer to the pipeline steps necessary to execute an instruction. A machine cycle includes individual intervals which correspond to pipeline stages and is related to the clock cycle.

At any given time, a pipeline processor is working on different stages of several instructions. As the clock cycles, instructions in the pipeline are advanced to the next stage, and a completed instruction leaves the pipeline while a new one enters it. Although instructions may still take five or more clock cycles to propagate to the beginning of the pipeline to the end, the processor can actually complete execution of one instruction in every clock cycle under ideal conditions.

A typical pipeline architecture includes five basic stages: fetch, decode, execute, memory, and write-back. Some processors divide the five basic pipeline stages into multistage operations to reduce the complexity of each stage, creating what some manufacturers call a super-pipeline design. The theory behind super-pipeline is that fewer logic operations need to be performed in each pipeline stage so that each stage can be completed in a shorter time, thereby allowing for a higher clock frequency. Some designs decouple or separate their instruction-fetch and decode logic from the execution units, permitting decode operations to proceed independent of executions.

A processor with a single pipeline is known as a scalar processor; only one instruction can enter the decode stage at a time. Advance processors that incorporate multiple pipelines are called super-scalar. These processors can process more than one instruction in a given clock cycle so they can process more instructions than a scalar processor at the same clock speed.

Increasing the average number of instructions that can be issued per clock cycle is critical to maximizing central processing unit performance. In the most straight forward implementation of a super-scalar design, the central processing unit can be severely hamstrung by certain situations that stall, or hold up, one of its pipelines. In a processor which provides in-order issue and in-order completion, anything that stalls the completion of an instruction in one pipeline will stall the other pipelines as well, because instructions have to leave the pipelines in the same order that they extend the pipelines.

Figure 4:
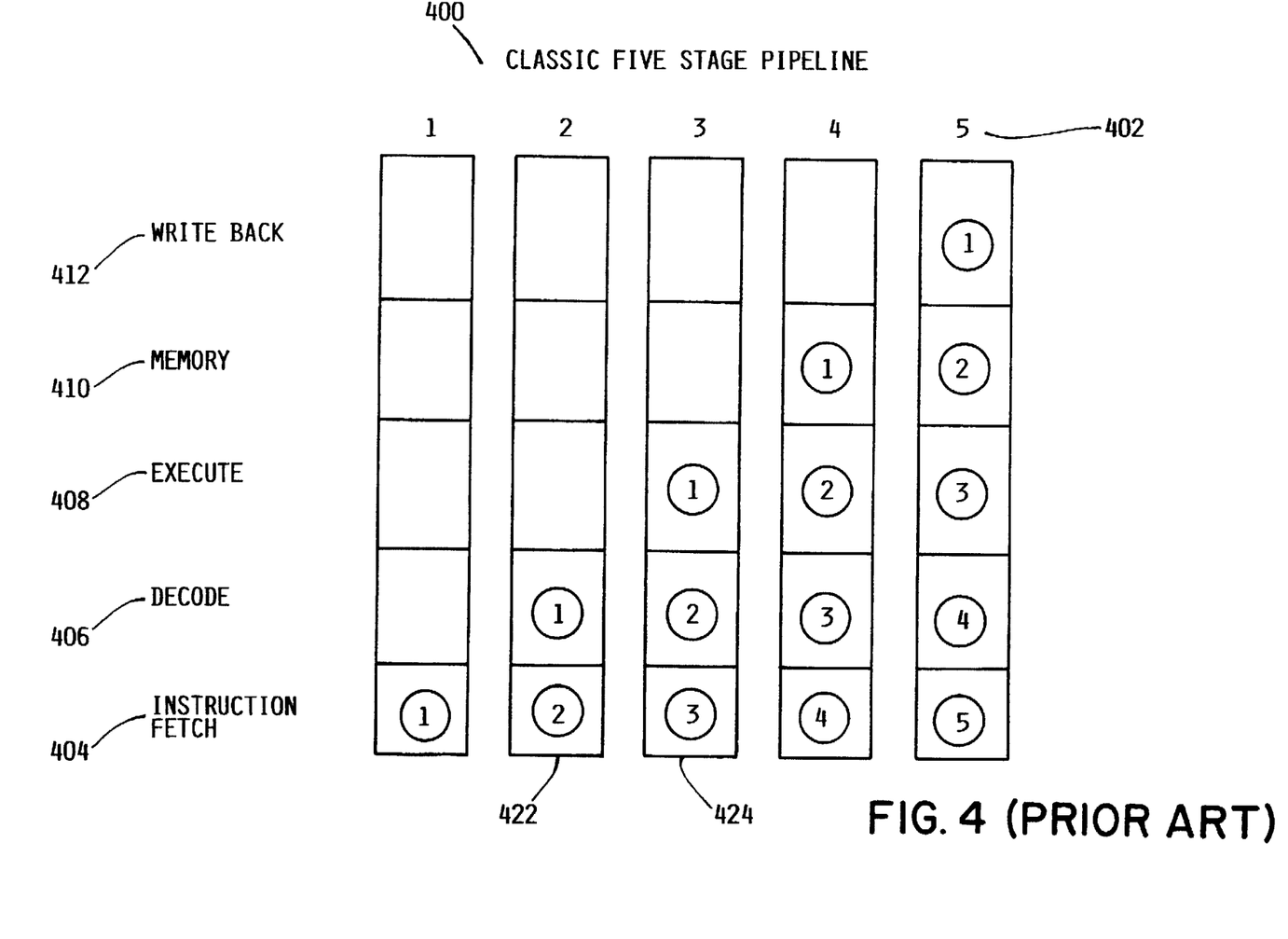
FIG. 4 shows a prior art five-stage pipeline structure.

FIG. 4 shows the operation and typical structure of an integer pipeline 400 across five clock cycles 402, wherein the pipeline includes five stages: Instruction Fetch (IF) 404, Decode (DE) 406, Execute (EX) 408, Memory (MEM) 410 and the Write Back (WB) 412. During each pipeline cycle, instructions from program "text" are fetched 404 from instruction cache into the prefetch buffers of the pipeline by the instruction fetch stage 404. In the second cycle 422, an instruction fetched in the previous cycle is then sent to the decode stage 406 which determines what type of function should be performed on the operands (register values). The processor finds and extracts code in the prefetch buffers and converts it into internal instruction format. The function could be one of the several arithmetic/logical unit (ALU) functions or a memory data reference operation.

In the third cycle 424, if the function called for a data memory reference, then the Execute stage 408 is used for calculating the effective address of the memory location and data is fetched from a memory address in the next cycle in the Memory stage 410. The result is written to the register, in case of loads, in the write back stage 412.

However, if the function is an ALU function then the operation is carried out in the Execute stage 408. In the following stage, memory stage 410, no operation is performed since the ALU function has already been performed. Finally in the fifth stage 412 of the pipeline, the computed result is written back into the register file. Delaying the register write until the final 412 stage facilitates in-order pipeline execution in a super-scalar processor and simplifies the register file management.

In a typical pipelined processor, results may be bypassed from one instruction to a later dependent instruction, rather than waiting for the register to be written. For a load instruction, a bypass from end of the memory stage 410 to the beginning of the execution stage 408 is used. A bypass to the beginning of memory stage 410 is also provided for a subsequent store instruction. For an ALU function, bypasses from end of the execution stage 408 and end of the memory stage 410 are provided.

Figure 5A:
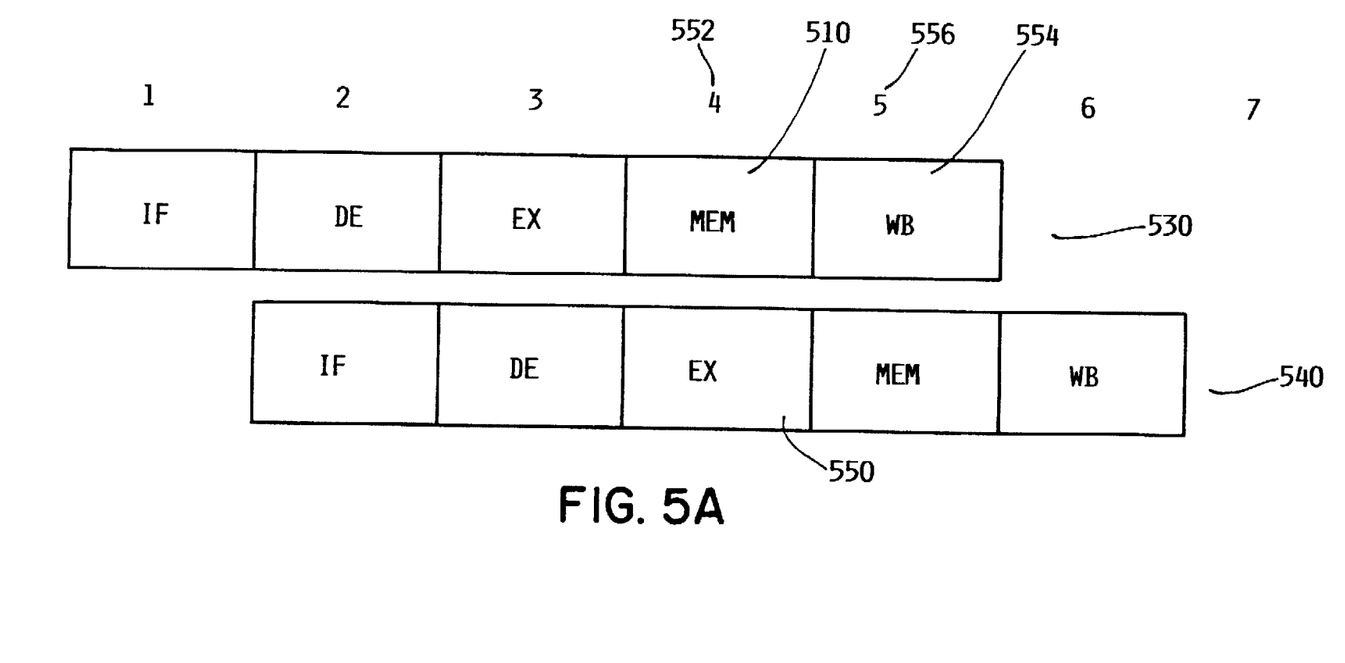
FIG. 5a,b show the operation of the five-stage pipeline structure of FIG. 4 wherein data are not available to the execute stage until one cycle later than required by execution stage.
Figure 5B:
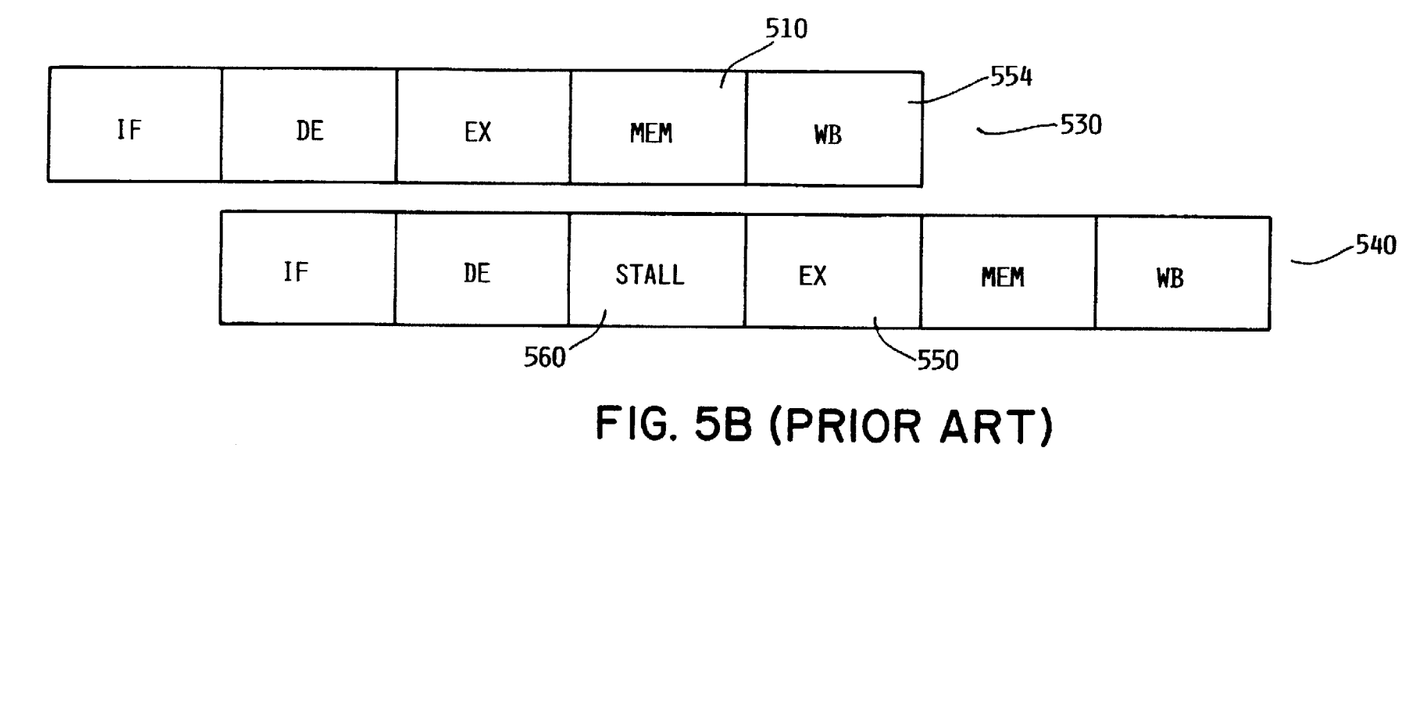

A problem common to pipelined processors is that the data value read in by the load instruction cannot be used by a following instruction in the next cycle. FIG. 5 illustrates one situation where this occurs. In FIG. 5, the first pipeline is instructed to load the first register from memory location A (Load r1<--A). The address of memory location is computed in the third stage and the memory address is in fourth stage. Then the second pipeline is instructed to add to the content of the first register, and then add the content of the first register to the second register (Add r2<--r1, #1).

FIG. 5 shows that the data value from the memory 510 of the first pipeline 530 is expected to be available to the Execute stage 550 of the second pipeline 540 when the load instruction is still doing the memory reference. However, the data will not be available to the execute stage 550 of the second pipeline 540 until one cycle later than required by the execution stage of the second pipeline 540. As a result, a cycle stall 560 in the execution time of the load-use instruction pair results wherein execution of the second pipeline 540 is stalled for one cycle to allow the EX stage 550 to receive the memory data, via the bypass path, in the next cycle.

This interlock or stall which is inserted between a load instruction and a following instruction that uses the memory data is referred to as the load-use interlock. On average, 20% of the instructions are loads, 50% of which result in the load-use penalty in a non-optimized code. Thus, on average, if the cycles per instruction (CPI) of a machine is 1.1 cycles, the load-use penalty can increase the CPI from 1.1 cycles to 1.1+(0.2*0.5)=1.2 cycles, a performance slowdown by 9%. This penalty becomes more severe for higher performance machines which have a smaller base CPI.

If the architecture supports delayed loads, then compiler optimization can reduce the interlocks to 20%, which can reduce the slowdown for the 1.1 base CPI machine to about 3.5%. However, because of various other design and performance reasons, some architectures do not employ the delayed loads and as such can potentially have a significant performance degradation if the code results in load-use interlocks.

In a super-scalar processor, the load-use interlock can occur between two instructions dispatched in the same cycle. In the case of a load and a dependent ALU instruction dispatched in the same cycle, the ALU instruction is stalled for two cycles.

Figure 6:
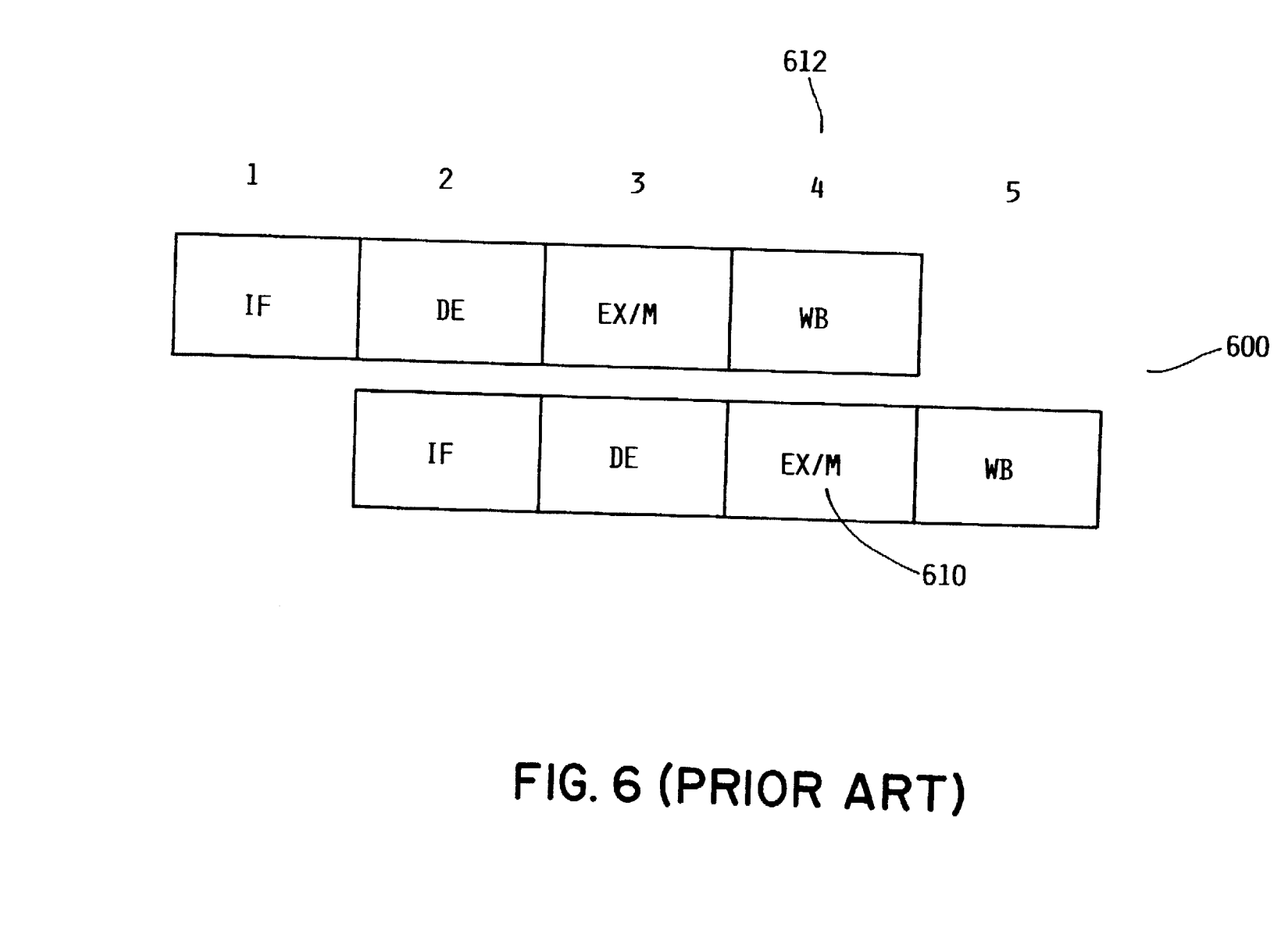
FIG. 6 illustrates a prior art pipeline structure that uses cascaded ALUs.

There are some pipeline configurations 600 that use cascaded ALUs, as shown in FIG. 6. This pipeline only allows two execute interlocked instructions 610 to be executed in the same "major" cycle 612. This does not solve the load-use penalty because the result of the load operation will not be available until after cycle 3.

Load-use interlocks may also be avoided by using compiler optimization techniques if the architecture supports delayed load instructions. However, the compiler methods do not work if there are no independent instructions to place between the interlocked load-use instruction pair. Yet another solution is to allow out-of-order execution in the hardware. In this case, there may be an independent instruction that can be executed while the dependent ALU instruction is stalled. However, implementing out-of-order execution is a significant increase in processor complexity.

It can be seen then that there is a need for a flexible pipeline which reduces the performance limiting interlocks in the execution of programs.

SUMMARY OF THE INVENTION

To overcome the limitations in the prior art described above, and to overcome other limitations that will become apparent upon reading and understanding the present specification, the present invention discloses a flexible pipeline which reduces the performance limiting interlocks in the execution of programs.

The present invention solves the above-described problems by providing a flexible pipeline architecture that can delay execution for ALU or load-use operations to the fourth stage of the pipeline.

A system in accordance with the principles of the present invention comprises a pipeline architecture wherein a pipeline includes a fetch stage, a decode stage, an execution stage, a hybrid memory/execution stage, and a write back stage. Since a result from the execution stage of a first pipeline may not be available to a second pipeline until the write back stage of the first pipeline as a consequence of an interlock, the execution stage of the second pipeline may be delayed one execution cycle and performed in the hybrid memory/execution stage or fourth stage of the second pipeline.

One aspect of the present invention is that the result from the execution stage is obtained either by a calculation of the effective address of a memory location or by performing ALU functions.

Another aspect of the present invention is that the third stage of operation of the second pipeline carries out a null operation when the execute operation is performed in the fourth stage as a consequence of a load instruction being followed by a use instruction resulting in a pipeline interlock.

Another aspect of the present invention is that a selection is made between the use of memory functions or execution functions in the fourth stage.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration various embodiments in which the invention may be practiced. It is to be understood that other embodiments may be utilized as structural changes may be made without departing from the scope of the present invention.

The present invention provides a flexible pipeline structure which reduces the performance limiting interlocks in the execution of programs. The present invention removes interlocks using a novel organization of the pipeline.

Figure 1:
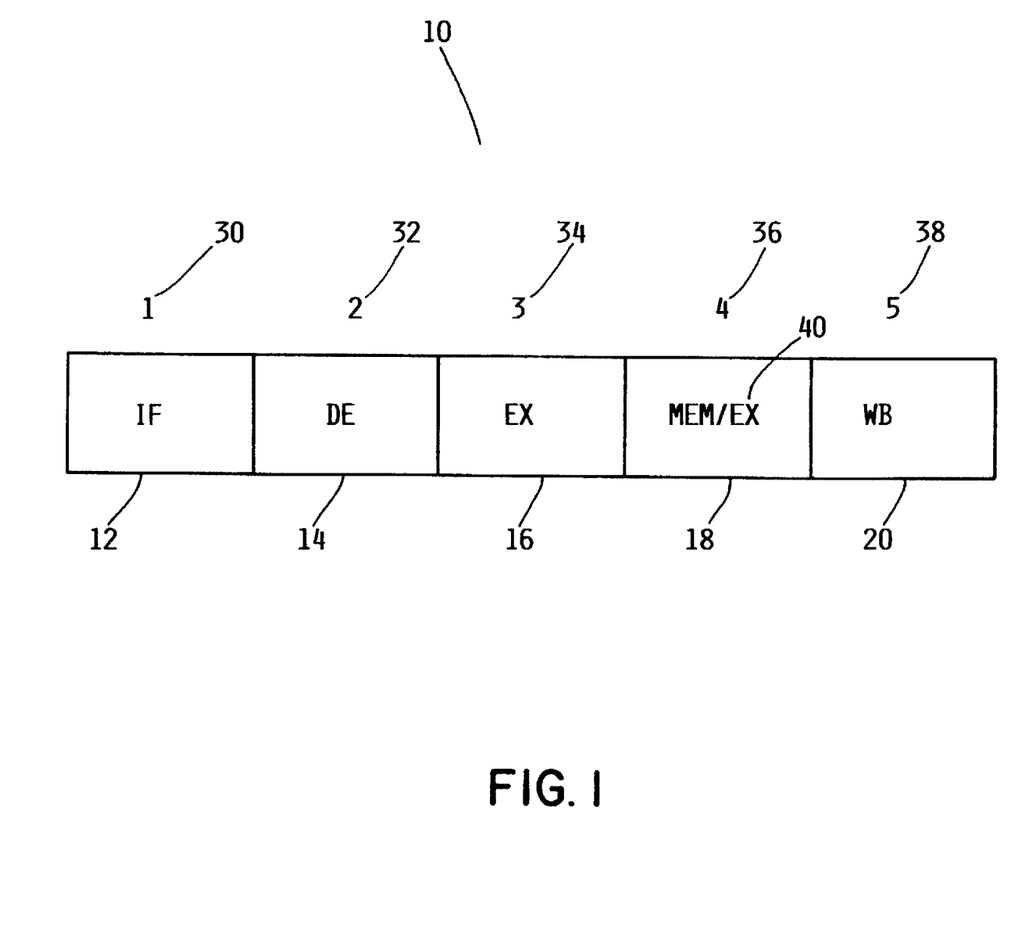
FIG. 1 shows an exemplary pipeline structure according to the present invention for removing the interlocks.

FIG. 1 shows an exemplary pipeline structure 10 according to the present invention that removes interlocks for an ALU instruction. The pipeline for a load instruction is not changed. The pipeline consists of 5 stages: Instruction Fetch (IF) 12, Decode (DE) 14, Execute (EX) 16, Memory (MEM) 18 and the Write Back (WB) 20 stages. Using the example described with reference with FIG. 4, the instruction fetch stage 12 brings instructions from program "text" from an instruction cache into the prefetch buffers of the pipeline in the first cycle 30. The processor, in the decode stage 14 finds and extracts code in the prefetch buffers and converts it into internal instruction format during the second cycle 32.

During the third cycle 23, the processor in the execute stage 16 calculates the effective address of the memory location or executes an ALU operation. In the next cycle 36, a memory reference may be made in the memory stage 18. In the fifth cycle 38, the result is written to the register in the write back stage 20.

However, as shown in FIG. 1, the pipeline includes the flexibility of allowing the ALU operation 40 to occur in the MEM stage 18 of the pipeline one execution cycle later instead of in the earlier EX stage 16. In the absence of load-use interlocked instructions, the pipeline operates just as in FIG. 3. Thus, the third stage, the EX stage has two modes of operation. The first operation mode is the execution of the decoded instructions to produce a result in the absence of a load-use interlock instruction and the second operation mode is a null operation in the presence of a load-use interlock instruction.

Furthermore, the fourth stage may operate in a normal mode or in a interlock operation mode. The normal operation mode is the fetching of data from a memory address in the absence of an interlock instruction. The interlock operation is the execution of the decoded instructions to produce a result in the presence of the interlock instruction.

Figure 2:
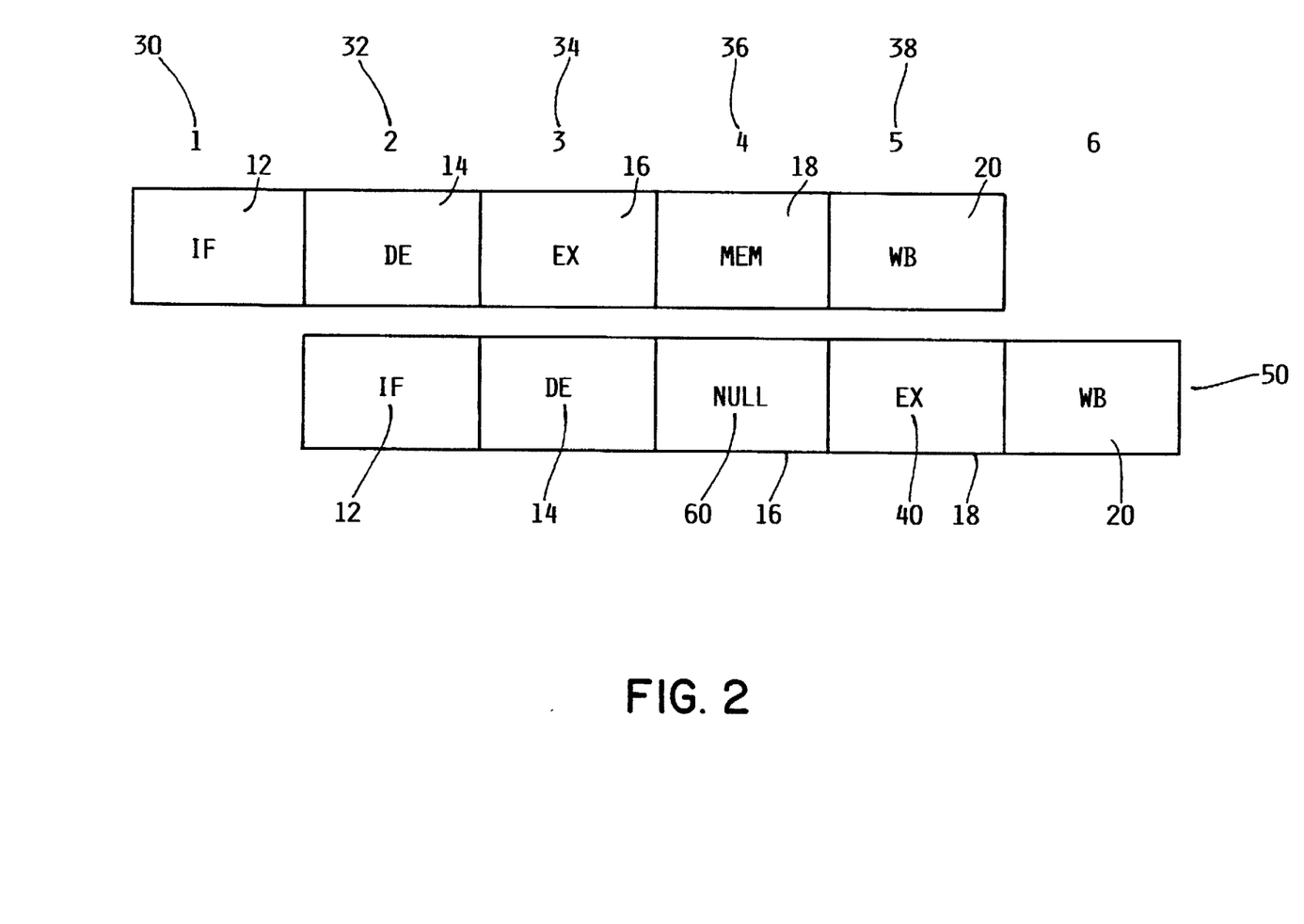
FIG. 2 illustrates the pipeline structure according to the present invention wherein the third stage of operation carries out a null operation and the execute operation is performed in the 4th stage.

FIG. 2 demonstrates the avoidance of the interlock because the second pipeline 50 does not need the loaded value until the start of cycle 5, which is when the load value is available from the previous load instruction. Thus, whenever a load instruction is followed by a "use" instruction that can result in a pipeline interlock, the third stage 16 of operation carries out a null operation 60 and the execute operation 40 is performed (or re-done) in the fourth stage 18 instead.

The pipeline control for this flexibility is no more complicated than what is already required for a typical pipeline. A simple selection has to be made between the use of MEM or ALU unit at the fourth stage 18 if the instruction can potentially result in an interlock. This decision can be accomplished at the decode stage 14 using logic already provided for the execution stall 60 in a typical pipeline.

Essentially, this configuration requires that there is an additional ALU 40 in the fourth stage 18. In modern microprocessors, an ALU is less than one percent of the chip area. Depending on the pipeline structure, there may be no additional bypasses needed to implement this pipeline structure. However, if the ALU pipeline is distinct from the load pipeline, a bypass into the fourth stage 18, i.e., the second EX stage, is needed.

Note that in a super-scalar processor with more than one ALU pipeline, this invention also allows two dependent ALU instructions, which are dispatched at the same time, to execute without stalls. The first ALU instruction is executed in the first EX stage 16 of its pipeline and the second ALU instruction is executed in the second EX stage 18 of its pipeline.

Figure 3:
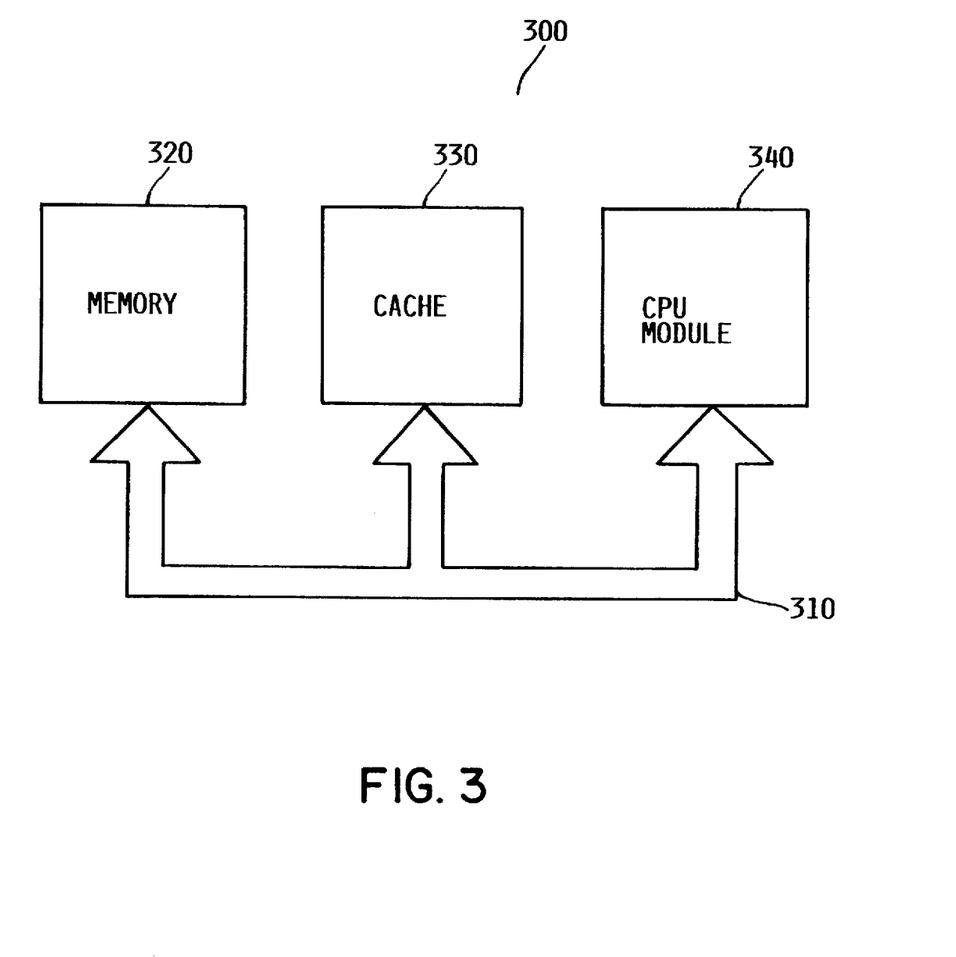
FIG. 3 illustrates a block diagram of a microprocessor system according to the present invention.

FIG. 3 illustrates a block diagram 300 of a microprocessor system or computer according to the present invention. A bus 310 is provided for routing data in the microprocessor system. Memory 320 for storing data is coupled to the bus 310. Cache 330 for holding recently-accessed data is also coupled to the bus. The memory and cache provide data to the CPU module 340 which includes at least one microprocessor (not shown). The CPU module 340 then performs pipeline operations according to a pipeline architecture of the invention. Those skilled in the art will recognize that the memory 320, cache 330 and CPU module 340 may be connected serially instead of using a common bus structure.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A pipeline architecture wherein execution of an operation during an execution cycle, the pipeline architecture comprising:

a first execution unit for performing a first and second type of executable function in a first execution cycle; and a second execution unit for performing the first type of executable function and a third type of executable function in a second execution cycle, the second execution unit being offset in the pipeline by at least one execution cycle from the first execution unit, the offset of the second execution unit allowing immediate execution of the first type of executable function during the second execution cycle by the second execution unit when the first type of executable function is not performed in the first execution unit.

2. The pipeline architecture of claim 1 wherein data is retrieved from outside the pipeline.

3. The pipeline architecture of claim 1 wherein the second execution unit is paired with memory.

4. The pipeline architecture of claim 1 wherein the execution cycle comprises a clock cycle.

5. The pipeline architecture of claim 1 wherein the first execution unit carries out a null operation when execution is performed by the second execution unit.

6. The pipeline architecture of claim 1 further comprising means for making a selection between the use of the first execution unit and the second execution unit.

7. A pipeline architecture for executing serially a sequence of instructions in a succession of execution cycles, wherein a result is produced representing concurrent execution of a first instruction and a second instruction in which the second instruction requires a result produced by execution of the first instruction, the pipeline architecture comprising:

a first pipeline comprising an execution stage, a hybrid memory/execution stage, and a write back stage; and a second pipeline, offset in operation from the first pipeline by one execution cycle, the second pipeline comprising an execution stage, a hybrid memory/execution stage, and a write back stage;

wherein, as a consequence of an interlock, a result from the execution stage of the first pipeline is unavailable to the second pipeline until the write back stage of the first pipeline, and execution by the second pipeline is performed in the hybrid memory/execution stage of the second pipeline.

8. The pipeline architecture of claim 7 wherein the result is obtained either by a calculation of the effective address of a memory location or by performing arithmetic/logical unit (ALU) functions.

9. The pipeline architecture of claim 7 wherein the execution cycle comprises a clock cycle.

10. The pipeline architecture of claim 9 further comprising means for making a selection between the use of memory functions or execution functions in the hybrid memory/execution stage.

11. The pipeline architecture of claim 10 wherein the selection is accomplished prior to the execution stage.

12. The pipeline architecture of claim 7 wherein the execution stage of the second pipeline carries out a null operation in the execution stage when execution by the second pipeline is performed in the hybrid memory/execution stage as a consequence of a load instruction being followed by a use instruction resulting in a pipeline interlock.

13. The pipeline architecture of claim 7 wherein the first pipeline is a load pipeline and the second pipeline is an ALU pipeline, and the pipeline architecture further comprises a bypass of the ALU pipeline.

14. The pipeline architecture of claim 7 wherein the first and second pipelines function as ALU pipelines having two dependent ALU instructions dispatched at the same time, the first ALU instruction being executed in the execution stage of the first pipeline and the second ALU instruction being executed in the hybrid stage of the second pipeline.

15. A microprocessor system comprising:

a bus for routing data in the microprocessor system;

memory, coupled to the bus, for storing data;

cache, coupled to the bus, for holding recently-accessed data; and a cpu module, coupled to the bus, the cpu module comprising at least one microprocessor;

wherein the microprocessor performs pipeline operations according to a pipeline architecture, the pipeline architecture comprising:

a first execution unit for performing a first and second type of executable function in a first execution cycle; and a second execution unit for performing the first type of executable function and a third type of executable function in a second execution cycle, the second execution unit being offset in the pipeline by at least one execution cycle from the first execution unit, the offset of the second execution unit allowing immediate execution of the first type of executable function during the second execution cycle by the second execution unit when the first type of executable function is not performed in the first execution unit.

16. The microprocessor system of claim 15 wherein the data is retrieved from outside the pipeline.

17. The microprocessor system of claim 15 wherein the second execution unit is paired with memory registers operation.

18. The microprocessor system of claim 15 wherein the execution cycle comprises a clock cycle.

19. The microprocessor system of claim 15 wherein the first execution unit carries out a null operation when execution is performed by the second execution unit.

20. The microprocessor system of claim 15 further comprising means for making a selection between the use of the first execution unit and the second execution unit.

21. A pipeline architecture, comprising:

a first stage for fetching instructions from program text;

a second stage, coupled to the first stage, for decoding the fetched instructions;

a third stage, coupled to the second stage, the third stage having a first and a second operation mode, the first operation mode being an execution of the decoded instructions to produce a result in the absence of a load-use interlock instruction and the second operation mode being a null operation in the presence of a load-use interlock instruction;

a fourth stage, coupled to the third stage, the fourth stage having a normal and a interlock operation mode, the normal operation mode being the fetching of data from a memory address in the absence of an interlock instruction, and the interlock operation being the execution of the decoded instructions to produce a result in the presence of the interlock instruction; and a fifth stage, coupled to the fourth stage, for writing the result to a register.

22. The pipeline architecture of claim 21 wherein the result is obtained either by a calculation of the effective address of a memory location or by performing arithmetic/logical unit (ALU) functions.

23. The pipeline architecture of claim 21 wherein the third stage carries out a null operation when the execution of the decoded instructions is performed in the fourth stage as a consequence of a load instruction being followed by a use instruction resulting in a pipeline interlock.

24. The pipeline architecture of claim 21 further comprising means for making a selection between the normal and the interlock operation modes of the fourth stage.

25. The pipeline architecture of claim 24 wherein the selection is accomplished at the second stage.

26. An instruction pipeline having a plurality of serially operating instruction stages for processing a plurality of overlapping instructions during each execution cycle, comprising:

fetch means, operable in a first stage, for fetching instructions from program text;

decode means, operable in a second stage coupled to the first stage, for receiving the fetched instruction and determining the functions to be performed on operands in the instruction, the instruction and operands being converted into an internal instruction format;

execute means, operable in a third or in a fourth stage, for performing executable functions based upon the decoded instructions and operands;

memory means, operable in the fourth stage, for fetching data from a memory address; and write back means for writing a result obtained from the execution functions to a register;

wherein the performance of the executable functions is delayed one cycle to the fourth stage in the presence of an interlock instruction.

27. The instruction pipeline of claim 26 wherein the executable functions comprise a calculation of the effective address of a memory location or execution of arithmetic/logical unit (ALU) functions.

28. The instruction pipeline of claim 26 wherein the execution cycle comprises a clock cycle.

29. The instruction pipeline of claim 26 wherein the third stage performs a null operation when the executable functions are performed in the fourth stage as a consequence of a load instruction being followed by a use instruction resulting in a pipeline interlock.

30. The instruction pipeline of claim 26 further comprising means for making a selection between fetching data from a memory address or performing executable functions in the fourth stage.

31. The instruction pipeline of claim 26 wherein the selection is accomplished at the second stage.

32. A method of processing serially operating instruction during an execution cycle, wherein execution of an operation during an execution cycle depends upon retrieval of data from outside the pipeline, the method comprising the steps of:

performing a first and second type of executable function in a first execution unit on data being advanced through the pipeline; and performing the first type of executable function and a third type of executable function in a second execution unit offset by at least one execution cycle from the first execution unit, the first type of executable function being performed immediately in the second execution unit upon retrieval of data from outside the pipeline when the first type of executable function is not performed in the first execution unit.

33. The method of claim 32 further comprising the step of performing a null operation in the first execution unit when execution on data is performed by the second execution unit.

34. The method of claim 32 further comprising the step of selecting between the use of the first execution unit and the second execution unit.

35. A method of processing serially operating instruction per execution cycle, comprising the steps of:

fetching instructions from program text during a first stage;

obtaining, in a second stage, operation codes from the fetched instructions and determining the functions to be performed on operands, the codes and functions being converted into an internal instruction format;

determining whether a load-use interlock will occur;

performing executable functions in a third stage based upon the decoded instructions and operands as a result of determining that a load-use interlock will not occur and inserting a null in the third stage as a result of determining that a load-use interlock will occur;

performing, in a fourth stage, executable functions based upon the decoded instructions and operands as a result of determining that an interlock will occur and fetching data from a memory address in the fourth stage as a result of determining that an interlock use will not occur; and writing a result obtained from the executable functions to a register.

36. The method of claim 35 wherein the step of performing executable functions further comprises the step of calculating the effective address of a memory location.

37. The method of claim 35 wherein the step of performing executable functions further comprises the step of executing arithmetic/logical unit (ALU) functions.

38. The method of claim 35 further comprising the step of making the third stage a null operation when the execute operation is performed in the fourth stage as a result of an interlock occurring.

* * * * *